United States Patent
Miller et al.

(10) Patent No.: US 7,698,683 B1
(45) Date of Patent: Apr. 13, 2010

(54) ADAPTIVE SYSTEM FOR DYNAMIC OBJECT-ORIENTED SCHEMAS

(75) Inventors: Clint Miller, Austin, TX (US); Ray Renteria, Pflugerville, TX (US); Mark Castoe, Cedar Park, TX (US); Daniel Rodney, Austin, TX (US); Craig Dalton, Austin, TX (US); Shad Reynolds, Austin, TX (US); Jeff Ellerbee, Austin, TX (US)

(73) Assignee: Troux Technologies, Austin, TX (US)

( * ) Notice: Subject to any disclaimer, the term of this patent is extended or adjusted under 35 U.S.C. 154(b) by 916 days.

(21) Appl. No.: 10/802,304

(22) Filed: Mar. 17, 2004

Related U.S. Application Data

(60) Provisional application No. 60/455,522, filed on Mar. 18, 2003.

(51) Int. Cl.
*G06F 9/44* (2006.01)
(52) U.S. Cl. .................................................. 717/104
(58) Field of Classification Search .......... 717/101–113
See application file for complete search history.

(56) References Cited

U.S. PATENT DOCUMENTS

| | | | |
|---|---|---|---|
| 5,572,732 | A | 11/1996 | Fant et al. |
| 6,226,792 | B1 * | 5/2001 | Goiffon et al. ............. 717/120 |
| 6,442,557 | B1 | 8/2002 | Buteau |
| 6,509,898 | B2 | 1/2003 | Chi et al. |
| 6,529,909 | B1 | 3/2003 | Boman-Amuah |
| 6,611,838 | B1 | 8/2003 | Ignat et al. |
| 6,662,188 | B1 | 12/2003 | Rasmussen et al. |
| 7,103,171 | B1 | 9/2006 | Annadata et al. |
| 7,124,180 | B1 | 10/2006 | Ranous |
| 7,428,546 | B2 | 9/2008 | Nori et al. |
| 2003/0110253 | A1 | 6/2003 | Anuszczyk |
| 2003/0177481 | A1 | 9/2003 | Amaru et al. |
| 2003/0208367 | A1 | 11/2003 | Aizenbud-Reshef |
| 2003/0212640 | A1 | 11/2003 | Andresen et al. |
| 2004/0002818 | A1 | 1/2004 | Kulp et al. |
| 2004/0049509 | A1 | 3/2004 | Keller et al. |

(Continued)

OTHER PUBLICATIONS

Robert Muller, "Database Design for Smarties Using UML for Data Modeling", Morgan Kaufmann Publishers, pp. 1-265, 1999.*

(Continued)

*Primary Examiner*—Ted T Vo
(74) *Attorney, Agent, or Firm*—Sprinkle IP Law Group

(57) ABSTRACT

Systems and methods for a generic data model for the representation of an arbitrarily complex environment are disclosed. These systems and methods allow the representation of any logical or physical entity and the associations and dependencies between these entities. Components may be used to represent the entities while relationships may be used to represent the associations and dependencies between the entities. A typing system may be utilized in conjunction with a generic data model to define a hierarchy of components and relationships for use with a particular category of environments. The data structures associated with a generic data model may be stored utilizing a table schema which does not change with the addition of new data structures or types of data structures. Applied data models created from these generic data models may be searched utilizing a query language which allows efficient searching of the applied data model, and structuring of the concomitant results.

19 Claims, 11 Drawing Sheets

U.S. PATENT DOCUMENTS

| | | |
|---|---|---|
| 2004/0073655 A1 | 4/2004 | Kan |
| 2004/0111513 A1 | 6/2004 | Shen |
| 2004/0225791 A1 | 11/2004 | Keskar |
| 2005/0033762 A1 | 2/2005 | Kasravi et al. |
| 2005/0138039 A1 | 6/2005 | Hagen |
| 2005/0203920 A1 | 9/2005 | Deng et al. |
| 2006/0106796 A1 | 5/2006 | Venkataraman et al. |
| 2006/0136437 A1 | 6/2006 | Yamasaki |
| 2006/0167927 A1 | 7/2006 | Edelstein et al. |
| 2006/0195460 A1 | 8/2006 | Nori et al. |
| 2006/0277022 A1 | 12/2006 | Pulfer |
| 2006/0294148 A1 | 12/2006 | Brunet |
| 2007/0192415 A1 | 8/2007 | Pak |

OTHER PUBLICATIONS

Davor Gomik, "UML Data Modeling Profile", 2002, Rational corp., TP162, pp. i-ii, 1-11.*

Cbop et al., "A UML Profile for Enterprise Distributed Object Computing—Joint Final Submission—Component Collaboration Architecture (CCA)", Feb. 2002, OMG Document No. ad/Aug. 19, 2001, http://enterprisecomponent.com/docs/EdocCCA.pdf, 169 pages.*

* cited by examiner

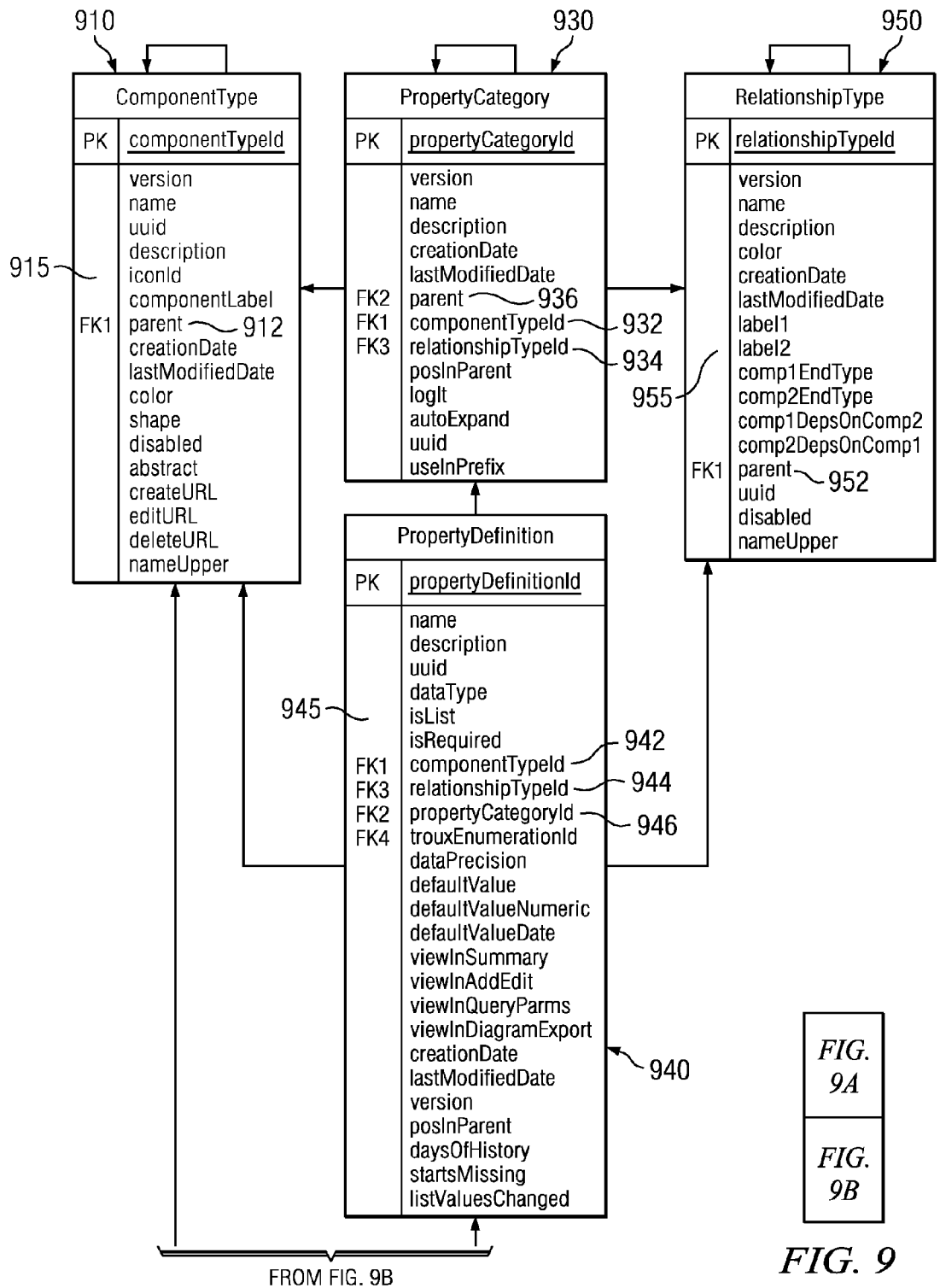

1000

| ComponentTypeID | Name |
|---|---|
| 1 | ComputerType |

| PropertyDefinition | Name | ComponentTypeID |
|---|---|---|
| 1 | RAM | 1 |
| 2 | OSType | 1 |
| 3 | FreeStorage | 1 |

| ComponentID | Name | ComponentTypeID |
|---|---|---|
| 1 | Server1 | 1 |
| 2 | Server2 | 1 |

*FIG. 12*

| ComponentID | PropertyDefinitionID | Value |
|---|---|---|
| 1 | RAM | 8 |
| 1 | OSType | Solaris |
| 1 | FreeStorage | 6 |
| 2 | RAM | 10 |
| 2 | OSType | Solaris1 |
| 2 | FreeStorage | 14 |

1310 → (points to first row)
1300 → (points to table)

| PropertyDefinition | Name | ComponentTypeID |
|---|---|---|
| 1 | RAM | 1 |
| 2 | OSType | 1 |
| 3 | FreeStorage | 1 |
| 4 | Cache | 1 |

| ComponentID | PropertyDefinitionID | Value |
|---|---|---|
| 1 | RAM | 8 |
| 1 | OSType | Solaris |
| 1 | FreeStorage | 6 |
| 2 | RAM | 10 |
| 2 | OSType | Solaris |
| 2 | FreeStorage | 14 |
| 1 | Cache | 2 |
| 2 | Cache | 1 |

ADAPTIVE SYSTEM FOR DYNAMIC OBJECT-ORIENTED SCHEMAS

RELATED APPLICATIONS

This application claims priority under 35 U.S.C. §119(e) to U.S. Provisional Patent Application No. 60/455,522, entitled "System and Method for Collecting, Modeling and Querying Information Technology Information" by Miller, et al., filed on Mar. 18, 2003. This application is related to U.S. patent application Ser. No. 10/803,133, entitled "Method and System for Querying an Applied Data Model" by Miller et al., filed on Mar. 17, 2004 and U.S. Pat. No. 7,523,128, entitled "Method and System for Discovering Relationships" by Miller et al., filed on Mar. 17, 2004. All applications cited within this paragraph are assigned to the current assignee hereof and are fully incorporated herein by reference.

COPYRIGHT NOTICE

A portion of the disclosure of this patent document, appendices included, contains materials to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

Computer Program Listing Appendix:

This application contains a computer program listing, attached as Appendices A and B. These appendices have been attached hereto and submitted on a single compact disc (in duplicate) which contains Appendices A-B in files respectively named:

appa.txt (created Mar. 12, 2004, 48 KB)
appb.txt (created Mar. 12, 2004, 52 KB)

The material contained in these files is hereby fully incorporated by reference herein. Additionally the material in the attached appendices A-C is hereby fully incorporated by reference.

BACKGROUND OF THE INVENTION

1. Field of the Invention

The invention relates in general to modeling data, and more particularly, to modeling an arbitrarily complex information technology environment with a generic data model.

2. Background of the Invention

The world is comprised of a wide and varied assortment of environments and subsystems. Akin to the proverbial butterfly flapping its wings in China and causing a hurricane over Texas, miniscule changes to one part of an environment may have catastrophic ripple effects in a distant part of the same environment. To anticipate these effects, it is helpful to study the ramifications of a change before it occurs. In order to observe the effects of these changes on an environment, it is useful to create a model of the environment. This model can then be used to discover the consequences of a change, and the combinatorial effects of multiple alterations to the environment.

However, because of the varied nature of their composition, many types of environments do not lend themselves to modeling. A microcosm of this problem occurs in many information technology (IT) environments. These IT environment may be intended to have a wide variety of uses: disseminating information about goods and services offered through a site on the World Wide Web, storing internal information related to a business, providing a programming infrastructure for development of software, or keeping track of sales and sales force information.

Consequently, these IT environments grow organically, sewn together in a Frankenstinian manner from a variety of heterogeneous machines and applications. Predicting the effects of machine crashes, application installations, network outages etc. on these IT environments is almost an exercise in futility without some sort of model. However, modeling these types of environments is a daunting prospect.

Typically, there are two approaches to creating models for these IT environments. The first is to create a diagram or a spreadsheet based inventory of the hardware assets and software applications that exist within the environment. This approach is problematic, creating these models requires an in depth evaluation of an IT system and manual creation of the documents, and whole document retention systems must be kept in place to version and store the documents associated with these types of models. Additionally, changes to the IT environment wreak havoc on these models. The effects from these changes must be manually traced through each of the diagrams, which are not only particularly prone to errors, but time consuming as well. Other problems with storing these models in documents include that there may be a large number of users who need to be able to access and modify these documents, and documents of this type don't lend themselves to concurrent modification, and that it is very difficult to cross-reference information across these documents.

The second approach, equally problematic, is to store the machines and applications which comprise the IT environment in tables in a relational database. Models created with these relational database tables, however, are particularly susceptible to changes in the IT environment itself. Adding layers, applications or dependencies to an IT environment may require changes to the table schema implementing the model, which may in turn may entail revising all the SQL statements used to implement the database. Therefore, in order to create a model using a relational database an in depth understanding of the IT environment is required, along with a relatively stable IT environment itself.

Thus, a need exists for methods and systems for a generic data model which can model an arbitrarily complex environment, and which allows the representation of any logical or physical entity and the associations and dependencies between these entities in a stable table schema which may be easily modified.

SUMMARY OF THE INVENTION

Systems and methods for a generic data model for the representation of an arbitrarily complex environment are disclosed. These systems and methods allow the representation of any logical or physical entity and the associations and dependencies between these entities. Components may be used to represent the entities while relationships may be used to represent the associations and dependencies between the entities. A typing system may be utilized with a generic data model to define a hierarchy of components and relationships for use with a particular category of environments. The data structures associated with a generic data model may be stored utilizing a table schema which does not change with the addition of new data structures or types of data structures. A query language may be utilized with a generic data model to search specific applications of the generic data model according to specific criteria.

In one embodiment at least two entities in the environment are represented with a component and an association between at least two components is represented with a relationship.

In another embodiment, each component is instantiated based on a component type.

In yet another embodiment, each relationship is instantiated based on a relationship type.

In still other embodiments, each component is represented in a component table.

In yet other embodiments, each relationship is represented in a relationship table.

In some embodiments, the relationship table links each relationship to at least two components.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 10-13 include a representation of tables associated with a table structure schema applied to a specific example.

FIGS. 14-15 include a representation of alterations to the tables depicted in FIGS. 11 and 13.

DESCRIPTION OF PREFERRED EMBODIMENTS

Figure 1:
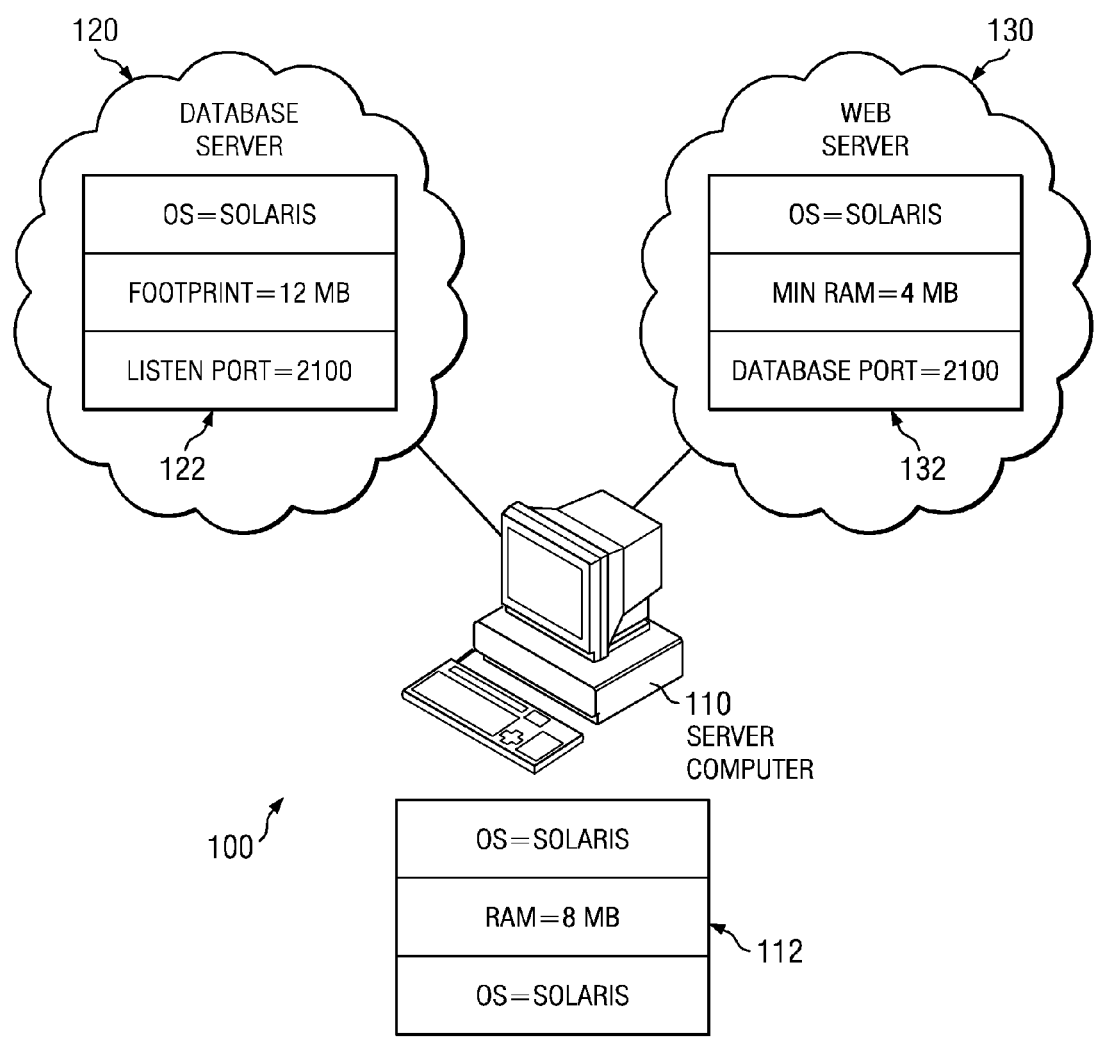
FIG. 1 includes an illustration of a simple IT environment.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification. The term "component" is intended to mean a representation of any definable, logical or physical entity. A component may have a group of properties. In an IT environment, an entity may be any portion of the environment desired to be represented, including hardware, such as a server or database, applications which may reside on one or more actual machines, virtual data repositories, firmware and the like. Many levels of abstraction are possible. For example, a network may be represented as a component, a subnetwork of that network may be represented as a component, a server on the subnetwork may also be represented as a component, an application running across that server and other servers may also be represented as a component, a table within that application may be represented as a component, etc.

The term "relationship" is intended to mean a representation of an association or dependency between two or more components. This association may be based on the property values of the components.

The term "blueprint" is intended to mean a representation of a container for two or more components and their associated relationships.

The term "check" is intended to mean a determination whether a relationship is valid, or a determination regarding the value or validity of a property of a component. Checks may be associated with components or relationships. In some cases a check is a piece of software which may be associated with a relationship or component. A check may have an output event, such as an email or notification.

The term "property" is intended to mean a characteristic associated with a component or a relationship. This property may have a name and a value associated with it, and components of the same type may have different values for the same property.

The term "type" is intended to mean a category of a relationship or a component. All relationships or components of the same type will have the same properties, though each instance of a component or a relationship may have different values for those properties. For example, a component type named "ComputerType" may be defined, having the properties of "RAM" and "OSType". Each instance of component type "ComputerType" will have the properties "RAM" and "OSType", however in one instance the value of "RAM" may be 4 megabytes, while in another instance the value of "RAM" may be 8 megabytes.

The term "data model" is intended to mean a model for representing anything in the physical world, coupled with logic pertaining to that representation.

The term "query" is intended to mean a statement intended to search an applied data model. A query may be comprised of a component query, which returns one or more components, or a relationship query which returns one or more relationships. A query is usually built with clauses and conjunctions.

The term "clause" is intended to mean a statement that may return a component, relationship, etc. based on criteria, such as a component's core attributes, component sets, relationships etc.

The term "conjunction" is intended to mean any statement which combines clauses or changes the order in which a clause is evaluated. Common conjunctions are "and", "or", "not" and the like.

The term "subtype" is intended to mean a specialization of a particular type of component or relationship. For example, a component type "computer" may be defined with certain properties. A more specialized version of the "computer" type may be represented as a subtype of "computer" called "server computer". The subtype "server computer" will inherit all the properties of its parent type "computer". A subtype is also a type, consequently subtypes may themselves be parents of subtypes.

Before discussing embodiments of the present invention, a non-limiting, simple IT environment used in depicting embodiments and examples of the present invention is briefly described. After reading this specification, skilled artisans will appreciate that many other more complicated environments may be utilized with embodiments of the present invention.

FIG. 1 includes a diagram of a simple IT environment 100. IT environment 100 includes a server computer 110. Server computer 110 may comprise a central processing unit ("CPU"), a read-only memory ("ROM"), a random access memory ("RAM"), a hard drive ("HD") or storage memory, and I/Os. I/Os can include a keyboard, monitor, printer, electronic pointing device (e.g., mouse, trackball, stylus, etc.), or the like. Server computer 110 may also be executing an operating system as is commonly known in the art. Server computer 110 may have a set of attributes 112, such as the type of operating system executing on server computer 110, amount of RAM, amount of free storage space and the like.

IT environment 100 may further contain database server application 120 and web server application 130. Database server application 120 and web server application 130 may have certain attributes 122, 132 which pertain to their particular implementation. For example, each may utilize certain storage resources, have a certain file system structure, require a certain operating environment, and have a certain footprint. Other attributes will be readily apparent to those of ordinary skill in the art. Each of these software applications 120, 130 may be executing on server computer 110. Additionally each of the computers in FIG. 1 may have more than one CPU, ROM, RAM, HD, I/O, or other hardware components. Note that FIG. 1 is a simplification of an exemplary hardware configuration. Many other alternative hardware configurations are possible and known to skilled artisans.

Attention is now directed to methods and systems for the generic modeling of data, and how to apply these generic data models to an arbitrarily complex environment. These systems and methods may model data generically by using a schema composed of three primitive data structures: components, relationships and blueprints. Components may be used to model any type of atomic entity, relationships may be used to model associations or dependencies between two or more components, and blueprints may be used to model an entire environment or subset of an environment. These data structures provide the ability to capture the state of any environment, represent this environment, and dynamically accommodate changes to the environment with a minimum of impact on the model of the environment, the underlying data structures themselves or the way these data structures are stored and represented. Once these applied data models are created they may be searched utilizing a query language which allows efficient searching of the applied data model, and structuring of the concomitant results. Though an IT environment will be used as an exemplary environment to demonstrate the power and flexibility of the data model, after reading this disclosure it will be apparent to those of ordinary skill in the art that this type of data model may be utilized to model any arbitrarily complex environment.

In an illustrative embodiment of the invention, the computer-executable instructions may be lines of assembly code or compiled $C^{++}$, Java, or other language code. Other architectures may be used. Additionally, a computer program or its software components with such code may be embodied in more than one data processing system readable medium in more than one computer.

Figure 2:
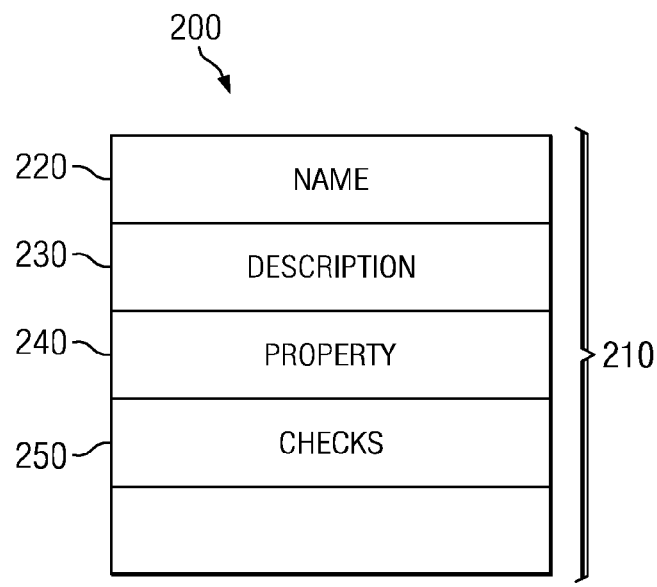
FIG. 2 includes a representation of a component.

Turning now to FIG. 2, a graphical representation of a component data structure is presented. Component 200 is a generic component which may be used to represent a logical or physical entity within an environment. Component 200 may have a set of fields 210 which contain information relating to the entity associated with component 200. Fields 210 may include a field for name 220, description 230, properties 240 and checks 250. Various other fields 210 may be included to further define component 200. Name field 220 may be used to particularly associate component 220 with a specific physical or logical entity. Description field 230 may further identify component 200, associate component 200 with a particular entity, or allow component 200 to be associated with a particular component type (as explained below).

Property field 240 may be used to represent the attributes or characteristics of the physical or logical entity represented by component 200, or with which component 200 is associated.

Property field 240 may be associated with one or more properties, a property may consist of a property name which may be associated with a value. This value in turn may correspond to an attribute of the physical or logical entity represented by component 200. A property may be a string, boolean, decimal number, date/time, or an enumerated' type, which describes the category of values a particular property may have. In one embodiment, a property may in turn be a data structure which has a name, a description, and a value. This data structure may then be given values based on an attribute of the entity represented by component 200.

Component 200 may also be related to a set of checks 250. A check may be a piece of logic which performs operations based on a certain set of conditions. These operations may consist of checking on the status of certain relationships associated with the component 200 (as described below), checking the status of certain properties 240, and other operations which will be readily apparent. These pieces of logic may be configured to operate automatically at certain time intervals, or may be applied at any point according to a variety of different triggering conditions which will be apparent to one of ordinary skill in the art after reading this disclosure.

Referring briefly back to FIG. 1, component 200 may be used to represent any object in IT environment 100. To represent server computer 110, name field 220 may be set to "server1", description 230 may be set to "server computer", property field 240 may contain three properties "OSType", "RAM", and "FreeStorage", which may be assigned the values corresponding to attributes 112 of server computer 110, "Solaris", "8 MB" and "6 MB" respectively.

Similarly, component 200 may represent database server 120; name field 220 may be set to "DB1", description 230 may be set to "database server application", property field 240 may contain three properties "OSType", "Footprint", and "Listen Port", which may be assigned the values corresponding to attributes 122 of database server 120, "Solaris", "12 MB" and "2100" respectively. As can be seen, component 200 may represent any entity, whether logical or physical equally well.

Figure 3:
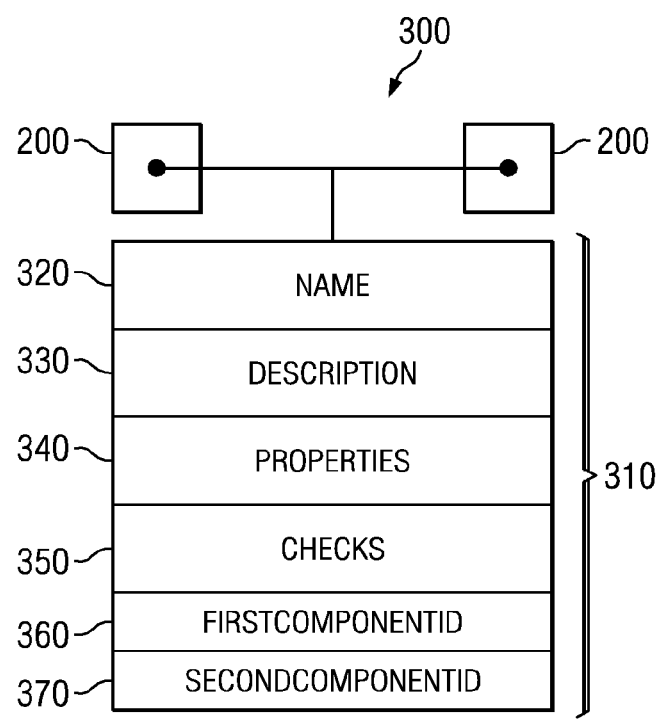
FIG. 3 includes a representation of a relationship.

Turning now to FIG. 3, a graphic representation of a relationship is depicted. Relationship 300 may be used to represent an association or dependency between two or more components 200. Relationship 300 may have a set of fields 310 which contain information pertinent to an association or dependency between two components. Fields 310 may include a field for name 320, description 330, property 340, and checks 350 as described above with respect to component 200. Name field 320 may be used to particularly associate relationship 300 with two or more physical or logical entities. In one embodiment, the name associated with name field 320 may be built programmatically based on the relationship type name and the names of the two components it is connecting. So, a "runs on" relationship type exists between component "app1" and "server1", the relationship name may be built automatically as "app1 runs on server1". That way, if either of the components' names changes, the relationship name may automatically changes to reflect this. Description field 230 may further distinguish relationship 300, associate relationship 300 with components, or allow relationship 300 to be associated with a particular relationship type (as explained below). Property field 340 may allow attributes of the relationships, dependencies between the relationships, or associations between the relationships, to be represented by a name and value pair. Checks 250 may contain one or more pieces of logic which perform operations based on certain set of conditions, as described above with respect to relationship 300. In a particular embodiment, fields 310 include fields 260, 270 to identify components 200 to which relationship 300 corresponds. Various other fields 310 may be included to further define relationship 300.

Returning for a moment to FIG. 1, relationship 300 may be used to represent any association between the logical or physical entities in IT environment 100. Component 200 may be used to represent database server 120 and server computer 110, as described above. Continuing with the above example, relationship 300 may be used to represent that database server 120 executes on server computer 110. Description 230 may be set to "runs on", property field 240 may contain a property "StartDate" which may be assigned the values corresponding to the date on which database server 120 began executing on server computer 110. To identify the components associated by relationship 300, FirstComponentID field 260 may be set to a name corresponding to server computer 110, in this example "server1"; likewise, SecondComponentID field 270 may be associated with component 200 representing database server 120. In one embodiment, row ids in a table are used to associate components with a relationship, thus, if a component is renamed relationships referencing this component do not have to be altered. As can be seen, relationship 300 may represent any association or dependency between any two or more logical or physical entities equally well.

However, as can be readily imagined, instantiation and definition of components and relationships for a complex environment may be a manually intensive process. To alleviate these concerns, in one embodiment, a typing system is included to allow the ability to define a hierarchy of component and relationship types which may serve as templates to instantiate components or relationships of these different types.

Figure 4:
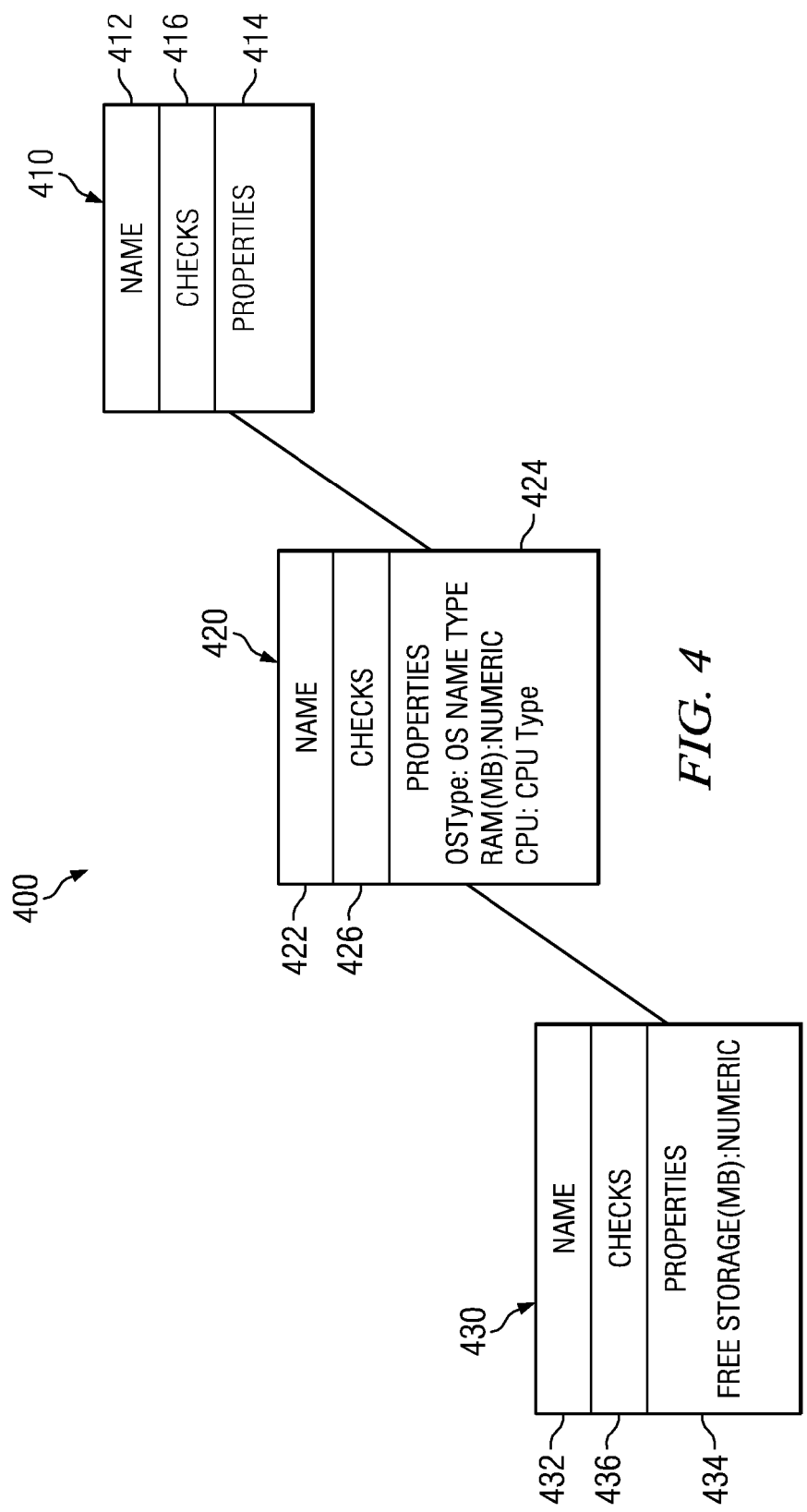
FIG. 4 includes a representation of a hierarchy of component types.

A hierarchy 400 of component types 410, 420, 430 is depicted in FIG. 4. Types 410, 420, 430 may provide different templates for instantiation of different components. Types 410, 420, 430 may have different fields depending on the intended use of a component instantiated from the type. A component may be instantiated from a type and values assigned to the fields of the component based upon the physical or logical entity represented by the component.

Generic component type 410 may have a set of fields as described above. These fields may include a name or description 412, a set of properties 414, and a set of checks 416. A generic component may be instantiated from generic component type 410, and used to represent an atomic entity. For example, in order to represent server computer 110, a user may instantiate component 200 from generic component type 410, name component 200, define the list of properties pertinent to server computer 110, give these properties values based on the attributes of server computer 110, define checks pertinent to server computer 110, etc. In this manner, component 200 can be created which represents server 110 accurately. However, representing a complex environment in this manner becomes labor intensive, as a component to represent each atomic entity within the environment may have to be created manually.

To remedy this problem, more specific component types may be defined which serve as templates to instantiate components which represent specific entities in an environment. For example, a computer component type 420 may be defined to serve as a template for components which represent computers. This computer component type 420 may contain properties 424 or checks 426 which are designed to represent a generic computer. A property within the set of properties 424 may contain a name and enumerated type corresponding to the values which that property may have. As expressed above, a property within the set of properties 424 may itself be a data structure; in this case a property may contain a name and a reference to a data structure. Examples of property names and their corresponding enumerated types are depicted in properties 424 of computer component type 420. Properties 424 and checks 426 will be common to all components instantiated from computer component type 420; in other words, all components instantiated from computer component type 420 will contain properties 424 and checks 426 of computer component type 420. This computer component type 420 may be used to instantiate component 200 to represent a computer in an environment, this component's 200 properties can then be assigned values based on the attributes of the computer which component 200 is intended to represent.

Figure 5:
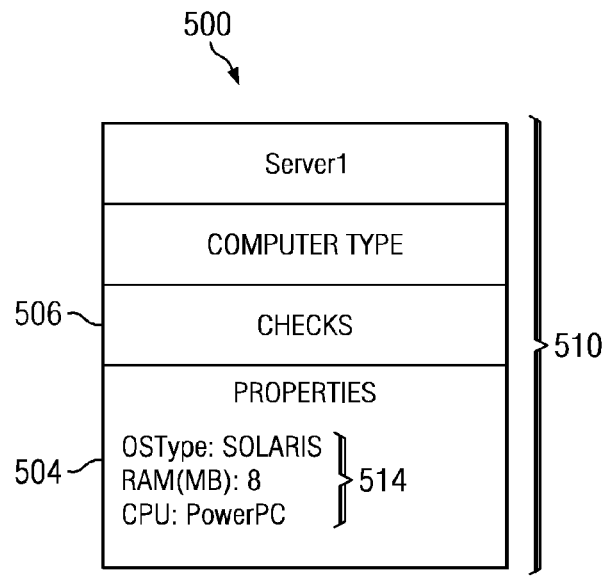
FIG. 5 includes a representation of a component instantiated from a component type.

FIG. 5 is a depiction of component 500 which has been instantiated from computer component type 420 to represent server computer 110. Component 500 has fields 510 corresponding to the fields defined by computer component type 420, including properties 504 and checks 506 contained in the type definition of computer component type 420. The values 514 of properties 504 of component 500 may correspond to characteristics or attributes 112 of server computer 110. If server computer 110 has 8 megabytes of RAM, the property named "RAM" of component 500 may be set to 8. If the operating system implemented on web server is Solaris, the value of the "OSType" property in component 500 may be Solaris, etc. In this manner, component 500 models server computer 110 by representing attributes 112 of server computer 110 with the properties 504 of component 500.

Returning now to FIG. 4, in many cases computers in an environment may perform a specialized function, such as server computer 110. To represent these specialized machines, it may be desirable to have additional properties in the components representing these specialized machines which are not present in computer component type 420. This discrepancy may be remedied manually; a component of type "computer" may be instantiated from computer component type 420 to represent server computer 110, and any specialized properties desired, but not contained, in this component may be added. Again, however, this process quickly becomes manually intensive when many specialized machines are present.

In some embodiments, a component subtype may be defined with respect to a parent component type. This component subtype represents a specialized subgroup of the respective parent component type. A component instantiated from a component subtype may inherit all the properties and checks corresponding to its respective parent component type. This inheritance mechanism allows the definition of a component subtype to contain only those properties and checks which are desired and which are not contained in the parent component type. Consequently, when component 200 is instantiated from a component subtype, component 200 contains all the properties and checks contained in the definition of the component subtype plus all the properties and checks contained in the definition of the parent component type.

For example, computer component type 420 may be defined to serve as a template for components which represent computers. This computer component type 420 may contain checks 426 or properties 424 which correspond to a generic computer, and will be common to all components instantiated from computer type 420. A server computer component subtype 430 may be defined with respect to parent computer component type 420. This definition may include only properties 434 and checks 436 specific to server computer component subtype 430. Consequently, when a component is instantiated from server computer component subtype 430 this component will contain all the properties 424, 434 and checks 426, 436 contained in both the parent computer component type 420 and the server computer component subtype 430. For example, if component 200 were instantiated from server computer component subtype 430, component 200 would contain the properties named "OSType", "RAM", and "CPU" contained in parent computer component type 420, and the property "FreeStorage" contained in server computer component subtype 430. These properties may then be assigned values.

It will be apparent to those of ordinary skill in the art the recursive nature of this type/subtype correlation and the inheritance characteristics that accompany these correlations. For example, a subtype may be the parent type of a second subtype. In addition to containing the checks and properties defined in the second subtype, a component instantiated from the second subtype will contain the checks and properties defined in both the first subtype and the original parent. The power and flexibility of such a system will also be apparent, a component hierarchy specifically tailored to any environment can be defined from a generic component type.

As described above, relationships are used in tandem with components to model arbitrary systems and environments by representing an association or dependencies between two components. As will be readily apparent, the same reasoning that applies to components with respect to a hierarchy of types may be applied equally well to relationships. Manual instantiation of relationships may be time consuming if the representation of many dependencies or associations is necessary. Consequently, types and subtypes corresponding to a particular category of these dependencies or associations may also be defined for relationships, and relationships instantiated from these defined types and subtypes. All principles described with respect to types and subtypes in the context of components are equally applicable to relationships, including the principle of inheritance.

Figure 6:
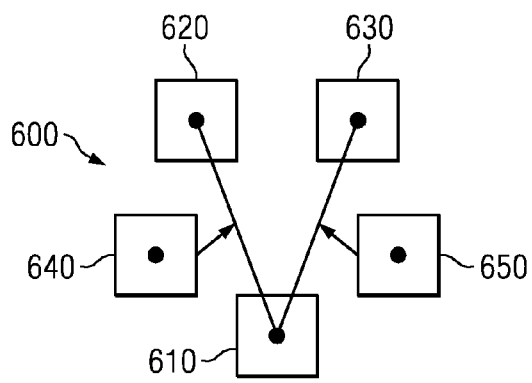
FIG. 6 includes a representation of an application of a data model to the IT environment of FIG. 1.

Moving on to FIG. 6, a representation 600 of using components and relationships to model a portion of IT environment in FIG. 1 is depicted. Component 610 represents the physical entity server computer 110 and has properties with values corresponding to attributes 112 of server computer 110. Components 620 and 630 represent logical entities database server 120 and web server 130 respectively. Properties of components 620, 630 may have values corresponding with attributes 122, 132 of database server 120 and web server 130.

Database server 120 executes on server computer 110. To represent this association, relationship 640 may be named "runs on", FirstComponentID field 360 of relationship 740 may be linked to component 620 representing database server 120, while SecondComponentID 370 may be linked with component 610 corresponding to server computer 110, and properties of relationship 640 may be defined accordingly. In this manner, the fact that database server 120 executes on server computer 110 may be modeled by relationship 640. Likewise, the fact that web server 130 also executes on server computer 110 may also be modeled. Relationship 650, also of type "runs on", may be instantiated, given properties, and associated with components 610, 630 representing web server 130 and server computer 110 using FirstComponentID field 360 and SecondComponentID field 370. This type of data model allows changes to an environment to be accommodated with a minimum of disturbance to the model of that environment. In particular embodiments, a blueprint may be used to contain the entire representation 600 of the IT environment.

Figure 7:
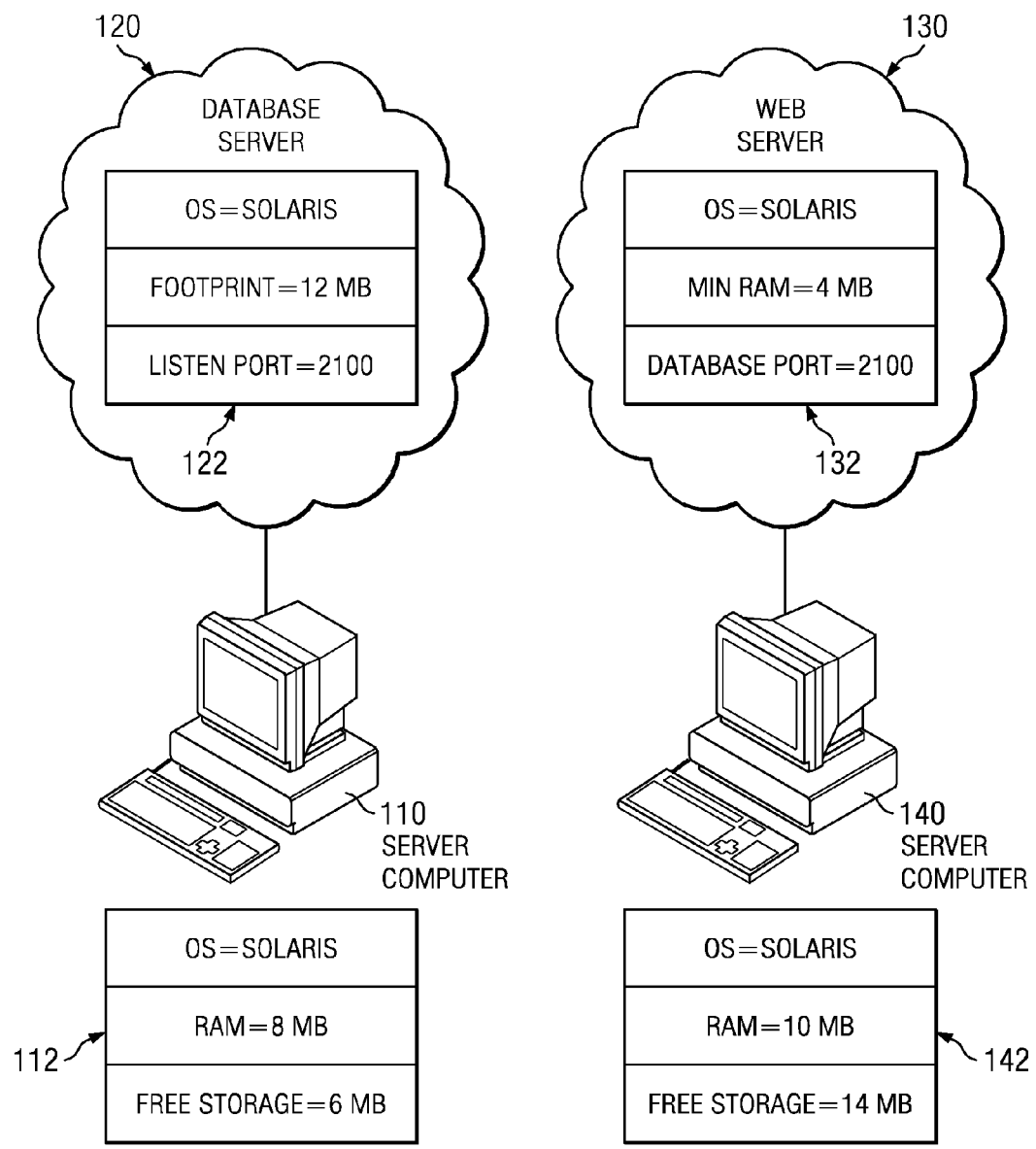
FIG. 7 includes an illustration of an alteration to the IT environment of FIG. 1.

Suppose that the IT environment depicted in FIG. 1 is altered to the IT environment depicted in FIG. 7. IT environment 100 now includes second server computer 140, with web server 130 executing on second server computer 140. Server computer 110, database server 120, and web server 130 remain unaltered, with exactly the same attributes 112, 122, 132. To represent the IT environment in FIG. 7 minimal changes to the model represented in FIG. 6 are necessary.

Figure 8:
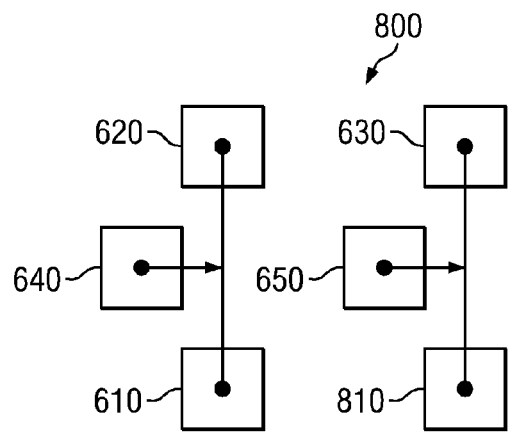
FIG. 8 includes a representation of an application of a data model to the IT environment of FIG. 7.

FIG. 8 is a representation 800 of an application of embodiments of the data model to the IT environment depicted in FIG. 7. Component 810, representing second server computer 140, has been added to the model. Properties of component 810 have values corresponding to attributes 142 of second server computer 140. Components 610, 620, 630 remain unaltered, as the entities which they represent remain unchanged. Relationship 640 also remains unaltered, as database server 120 still executes on server computer 110. Relationship 650, representing the association between web server 130 and the entity on which web server 130 executes, must be altered to accurately represent that web server 130 now executes on second server computer 140. This alteration may be accomplished simply by changing SecondComponentID field 370 of relationship 650 to an association with component 810 representing server computer 140. Relationship 650 now accurately depicts the association between web server 130 and second server computer 140. As can be seen, changes to a particular environment can be easily accommodated by the data model with a minimum of change to the actual data structures which represent the environment.

Figure 9B:
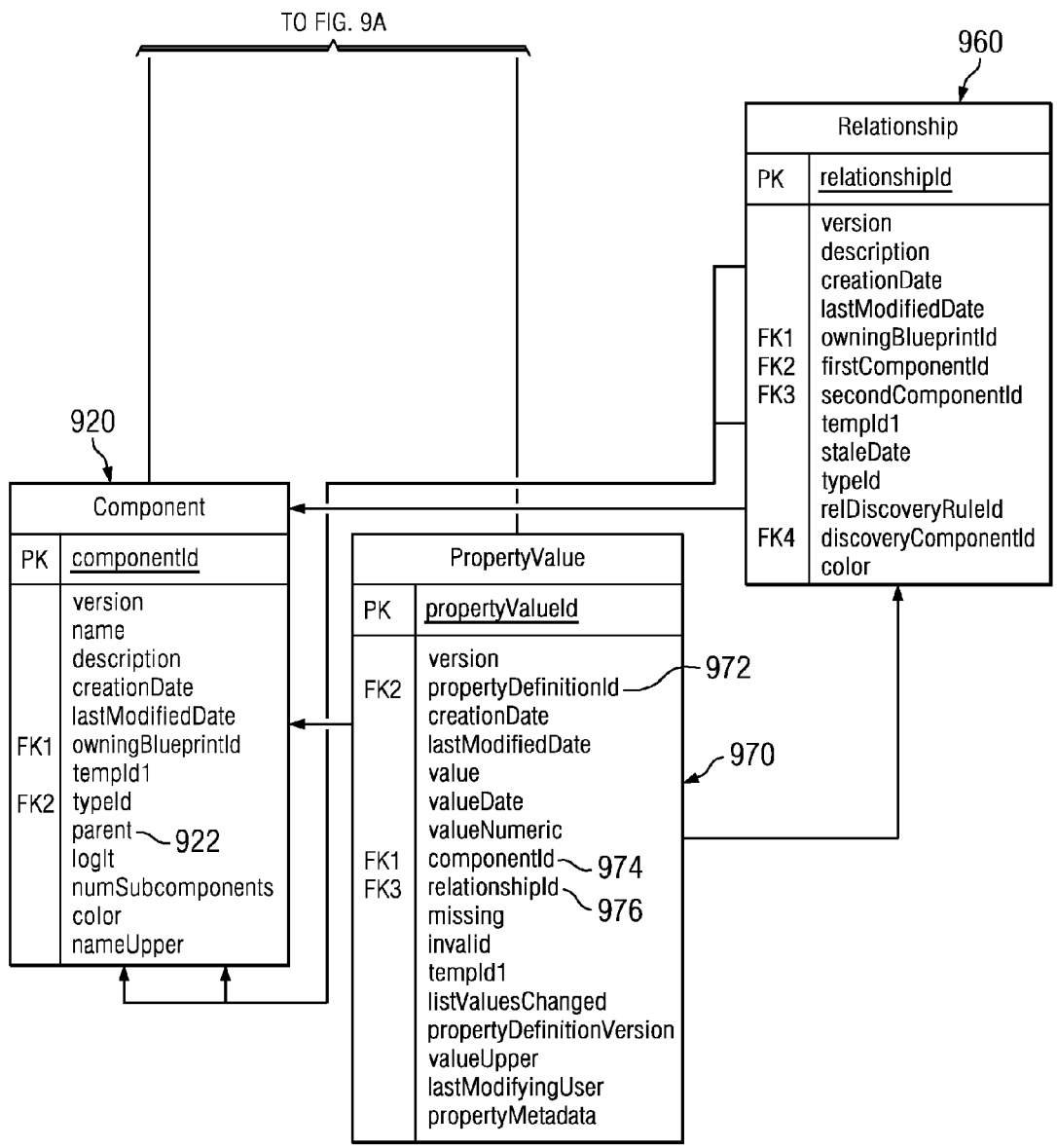
FIG. 9 includes a representation of a table structure schema for implementing a generic data model.

Additionally, the data structures corresponding to a particular data model may be stored in a schema which allows the addition of components, relationships, properties and types without any change to the underlying schema used to represent these data structures. FIG. 9 depicts one embodiment of a table schema which may be utilized with embodiments of the present invention to store data structures, such that the table schema will not have to be altered with the addition of a new data structure, or an alteration to an already existing data structure. Table schema 900 contains ComponentType table 910, Component table 920, PropertyCategory table 930, PropertyDefinition table 940, PropertyValue table 970, RelationshipType table 950 and Relationship table 960.

ComponentType table 910 may define component types (as discussed above), and contain a set of columns 915 related to fields of a component type. "Parent" column 912 may be used to represent the parent of a component type, in this case each subtype contains a reference to its parent component type.

RelationshipType table 950 is constructed substantially the same as ComponentType table 910 and contains a set of columns 955 including a parent column 952.

PropertyCategory table 930 may also contain a set of columns 935 related to the definition of a property. PropertyCategory table 930 may define categories of properties, and provide a hierarchical structure for properties based on a type. For example, on computer component 420 there may be three divisions of properties, hardware information, operating system information and IT personnel information. Rather than having these properties mixed together as one large group, it may be helpful to divide these properties into three separate categories. Categories within PropertyCategory table 930 may form an arbitrarily deep tree, where any category in the tree can contain property definitions.

Each category within PropertyCategory table 930 may be associated with a component type or relationship type. In one particular embodiment, this association may be through the componentTypeId field 932 or relationshipTypeId field 934 respectively, while an association with a parent category may be established through the parent field 936.

PropertyDefinition table 940 may contain definitions of particular properties defined by columns 945. Properties within PropertyDefinition table 940 may be defined with respect to a category, and may contain a link to this category in propertyCategoryID field 946. To increase performance, property definitions may also have links back to the component type or relationship type with which they are associated through the componentTypeId field 942 or relationshipTypeId field 944 respectively. Property definitions within PropertyDefinition table 940 may also provide meta information such as name, or input/output attributes. In one embodiment, these definitions do not have values, they only describe what properties exist with respect to a component type or relationship type, not the values these properties actually have.

Relationships are stored in the Relationship table 960. Relationships are associated with components through firstComponentID field 962 and secondComponentID field 964, and may have a link to their relationship type through typeID field 966. Note that this representation depicts relationships as having two ends (that is, they are binary), those of ordinary skill in the art will realize after reading this disclosure that other database schemas could be created that allow relationships to have arbitrary numbers of components simply by removing the firstComponentID and secondComponentID fields from relationship table 960 and creating a new table called RelationshipToComponent that has two columns: a relationship ID and a component ID. Each relationship would have n rows in this table corresponding to the n components attached to the relationship.

Components are stored in the Component table 920. Components may be linked to their type through typeID field 922. Components in turn may have subcomponents, which in turn can have subcomponents etc. Thus, components may form hierarchies of arbitrary depths. This containment correlation should not be confused with the type/subtype correlation described above. For example, a database component may contain table subcomponents, which contain column subcomponents etc. Yet no inheritance is implied, since a column is not a table, which is not a database etc. These component hierarchies are established through the parent field 922 which may link a subcomponent with its parent component.

PropertyValue table 970 may be used to associate a value with a property definition for a particular component or relationship. Each property value within PropertyValue table 970 may have a link to a property definition using the field propertyDefinitionID 972, and a link to either the component or relationship with which it is associated using componentID 974 or relationshipID 976.

To illustrate why a schema of this type may remain static whenever a new property, component or relationship is added, an example is helpful. Suppose there are two components in an environment, "Server1" and "Server2", and both these components have been instantiated from the one component type, "ComputerType". Component type "ComputerType" has three properties defined with respect to it, "RAM", "OSType" and "FreeStorage". Therefore, "Server1" and "Server2" both have three values associated with these properties.

FIGS. 10-13 illustrate what the tables might look like for such an example. FIG. 10 illustrates ComponentType table 1000 containing "ComputerType" component type, with a ComponentTypeId of 1. FIG. 11 shows PropertyDefinition table 1100 containing the definition of three properties "RAM", "OSType" and FreeStorage", and their respective PropertyDefitionIDs 1, 2 and 3. These property definitions are all linked through ComponentTypeID field to ComponentTypeID 1, corresponding to "ComputerType" component type as illustrated in ComponentType table 1000.

FIG. 12 illustrated Component table 1200, containing components "Server1" having ComponentID 1 and "Server2" having ComponentID 2. Both component are linked with ComponentTypeID 1 corresponding to "ComputerType" component type, as contained in ComponentType table 1000. Consequently, each component "Server1" and "Server2" will have the three properties "RAM", "OSType" and "FreeStorage" identified in PropertyDefinition table 1100, along with their corresponding values.

These properties and values are illustrated in FIG. 13. PropertyValue table 1300 contains a ComponentID linked with a PropertyDefinitionID associated with a Value. For example the first row 1310 in PropertyValue table 1300 contains ComponentID 1, corresponding to "Server1", linked to PropertyDefinitionID 1, associated with a Value of 8. ComponentID of 1 identifies component "Server1" as illustrated in Component table 1200, while PropertyDefinitionID 1 identifies the PropertyDefinition "RAM" as shown in PropertyDefinition table 1100. Consequently, the property "RAM" of component "Server1" will have the value 8.

Now, suppose it is desirable to model another type of property, called "Cache", with respect to "ComputerType"

component shown in ComponentType table 1000. Rather than having to add new tables or columns to the table schema, all that may be required is the addition of rows to the existing table.

FIGS. 14 and 15 illustrate the changes to the existing tables that may occur to model the property "Cache" in the context of the present example. FIG. 14 illustrates the addition of the PropertyDefinition "Cache" to PropertyDefinition table 1100. Row 1110 of PropertyDefinition table 1100 contains the definition of the property "Cache", and its PropertyDefinitionID 4. This property definition is linked through ComponentTypeID field to ComponentTypeID 1, corresponding to "ComputerType" component type as illustrated in ComponentType table 1000. PropertyDefinition "Cache" is now added to the data model, and associated with component type "ComputerType", consequently, components "Server1" and "Server2" of component type "ComputerType" will now be associated with the PropertyDefinition "Cache" and have values for this property.

The addition of these properties and values is illustrated in FIG. 15. Row 1320 in PropertyValue table 1300 contains ComponentID 1, corresponding to "Server1", linked to PropertyDefinitionID 4 and associated with a Value of 2. ComponentID of 1 identifies component "Server1" as illustrated in Component table 1200, while PropertyDefinitionID 4 identifies the PropertyDefinition "Cache" as shown in row 1110 of PropertyDefinition table 1100. Consequently, the property "Cache" of component "Server1" will have the value 2. Similarly, Row 1330 in PropertyValue table 1300 contains ComponentID 2, corresponding to "Server2", linked to PropertyDefinitionID 4 and associated with a Value of 1. ComponentID of 2 identifies component "Server2" as illustrated in Component table 1200, while PropertyDefinitionID 4 identifies the PropertyDefinition "Cache" as shown in row 1110 of PropertyDefinition table 1100. Accordingly, the property "Cache" of component "Server1" will have the value 2. The property "Cache" has been added to the data model, associated with components and component types and given values, however, the underlying table schema has not been altered. It will be apparent to those of ordinary skill in the art that these same methodologies may be applied to add, or delete, any element or structure from a data model without altering the underlying schema. Examples of code operable to implement tables of the type described is presented in Appendix A and Appendix B.

Figure 16:
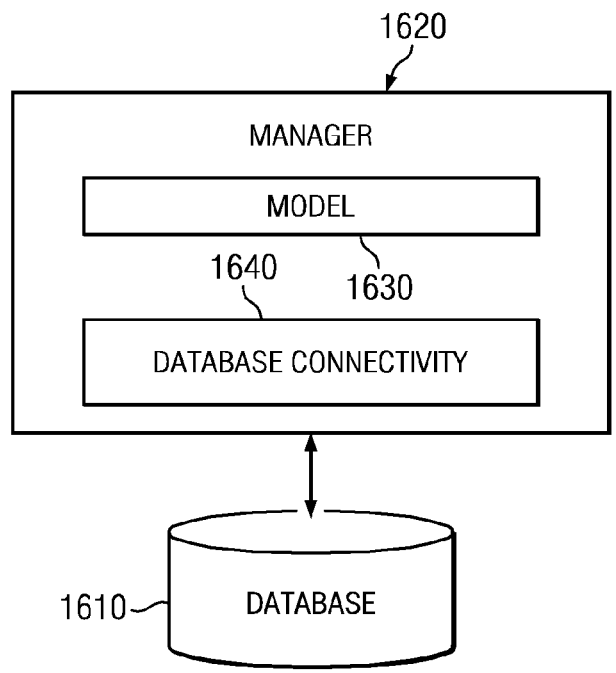
FIG. 16 depicts an embodiment of a software architecture for implementing the systems and methods described.

FIG. 16 illustrates one possibility for an architecture to implement, store and access a data model, and the associated table schema and applied data models, implemented in accordance with described embodiments. System architecture 1600 consists of manager 1620, model 1630, database connectivity 1640 and database 1610. In one embodiment, database 1610 is configured to store the tables schema associated with the data model implemented by model 1630. Database may be a Microsoft SQL server, an Oracle database, IBM DB2, or the like. As will be readily apparent to those of ordinary skill in the art, many sorts of databases may be used to implement these table schemas.

Model 1630 may implement a data model, and the applied data models created using the data model. Model 1630 is responsible for creating the components, relationships, properties and blueprints which may make up an applied data model. These elements of an applied data model may then be stored in the table schema implemented in database 1610. Model 1630 may access these stored elements and make alterations to the applied data model. In one embodiment, to access database 1610, model 1630 may issue an SQL statement, as is commonly known in the art.

Model 1630 may access database 1610 through database connectivity 1640. Database connectivity 1640 may serve as an interface between model 1630 and database 1610. This may consist of translating statements or queries issued by model 1630 into commands which database 1610, or database management system (DBMS) associated with database 1610, may understand. In one particular embodiment, database connectivity 1640 is a standard database access methodology such as Java Database Connectivity (JDBC) or Open Database Connectivity (ODBC) capable of translating SQL commands issued by model 1630 into commands capable of execution by a DBMS associated with database 1610.

Manager 1620 may be a set of service intended to aid in the management, control and access of model 1630. Manager 1620 may be an abstraction layer that allows access to model 1630 from other application which utilize model 1630. As the complexity of model 1630 increases it becomes increasingly difficult to glean desired information, or associations from model 1630. To combat this problem, manager 1620 may provide an efficient system for accessing and retrieving information contained in model 1630.

These systems may be capable of accessing information based on a wide variety of criteria, including properties and groupings of relationships or components. Additionally, these systems may allow access to arbitrary depths of complex dependencies for a component, relationship, property or type of component, relationship or property.

In one embodiment, this system uses a language which aids in searching or querying model 1630 to retrieve a set of components or relationships. This language may translate a statement in a certain format to one or more statements which may be employed by model 1630 or database connectivity 1640.

Figure 17:
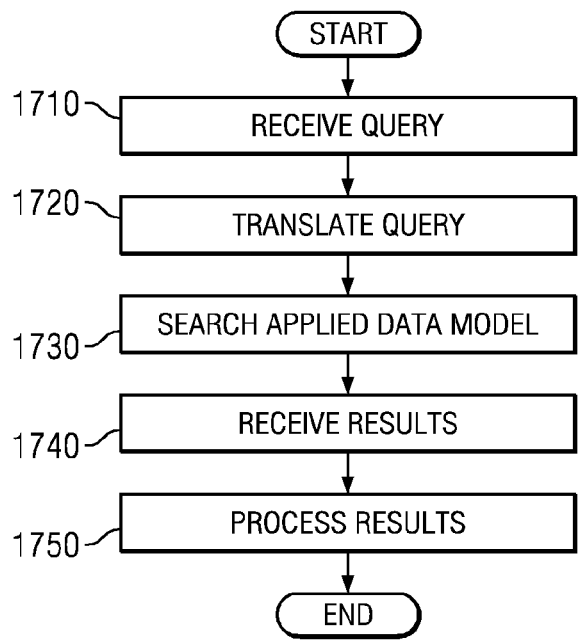
FIG. 17 illustrates an embodiment for a method of searching an applied data model constructed in accordance with the described systems and methods.

FIG. 17 depicts one embodiment of a methodology for searching a data model or an applied data model. A query may be received (block 1710), this query may be translated into a set of statements (block 1720), the data model or applied data model searched based on this set of statements (block 1730), a set of results received (block 1740) and these results processed based on the query (block 1750.

Users or applications which employ model 1630 may desire to obtain information from model 1630 based on a wide variety of criteria, such as component core attributes, component hierarchies, component types, property values, relationship types, etc. To obtain this information users or applications may formulate a query, which may then be received (block 1710) by model 1630 or manager 1620.

In one embodiment, a language may exist which assists in the formulation of a query. As explained above, an applied data model of an environment may grow very complex and include a wide variety of component types and relationship types. To search through model 1620 which implements such an applied data model, it is helpful to have a language which allows the formulation of a query with a greater degree of specificity. It is also helpful if the language utilized aids efficient searching of database 1610 in which model 1630 is stored.

In a particular embodiment, a language of this sort may support two types of queries, component queries and relationship queries. Component queries may return components, whereas relationship queries may return relationships. These queries may be built with clauses and conjunctions. A clause is a statement that returns components or relationships based on criteria, a conjunction may combine clauses, or change the order in which a clause is evaluated. An example of a syntax and vocabulary for such a language is presented in Appendix C.

Once a query is received (block 1710) this query may be translated into a set of statements (block 1720) or commands which database connectivity 1640 or database 1610, or database management system (DBMS) associated with database 1610, may understand. In one particular embodiment, the set of statements may be translated (block 1720) from a query language into a set of SQL commands capable of execution by a DBMS associated with database 1610. These statements may also be tailored to model 1630 stored in database 1610.

Based on this set of statements, an applied data model resident in database 1610 may be searched (block 1730). Embodiments of the data model described above may be applied to generate an applied data model, and this applied data model may consist of a set of components and a set of relationships that exist between these components. These sets of relationships and components interrelate to one another in such a way that a graph may be used to represent an applied data model.

For example, suppose an applied data model utilizes three component types: "business unit", "application" and "machine", and three relationship types: "uses application", "sends data to", and "runs on". The relationship type "uses application" is defined so it may describe associations or dependencies between components of type "business unit" and components of type "application". The relationship type "sends data to" is defined so it may describe associations or dependencies between components of type "application" and components of type "application", and relationship type "runs on" is defined so it may describe associations or dependencies between components of type "application" and components of type "machine". Though these sets of relationships and components may be represented as three component tables and three relationship tables as described above; these sets may also be represented and stored as a graph of components and relationships.

Figure 18:
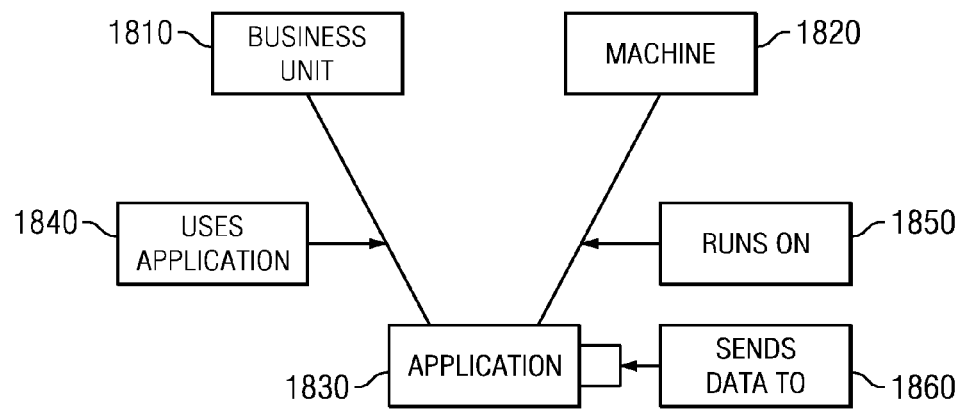
FIG. 18 illustrates a graph representation of an example of an applied data model constructed in accordance with the described systems and methods.

FIG. 18 depicts a graph of the component and relationship sets of the current example. A standard breadth first search algorithm for a graph of this sort may be written in pseudocode as:

Inputs:
    startingNodes=set of nodes to start the search from
        numLevels=maximum number of levels to traverse out from the starting nodes
    Let returnNodes be an empty set containing graph nodes.
    Add all nodes from startingNodes into set returnNodes.
    for i=1 to numLevels
    do
        Let newNodes be the set of all nodes n in the graph such that n is not an element of returnNodes and there exists at least one node in returnNodes that has a relationship to n.
        If newNodes is empty, break out of the loop.
    end
    Return returnNodes.

As can be seen from FIG. 18, the components and relationships of an applied data model generated in accordance with embodiments of the data model described above may be represented as a graph of homogeneous objects. Thus, a breadth first search algorithm tailored to a data model may be used to traverse a graph of this sort. In certain embodiments, the query may be translated (block 1720) into a set of SQL statements which may be capable of executing such an algorithm, which may be represented in pseudocode as:

Inputs:
    startingComponents=set of components to start the search from
    numLevels=maximum number of levels to traverse out from the starting components
Create a temporary database table Temp that can hold component ID's.
Add all the ID's of the components in startingComponents to Temp.
for i=1 to numLevels
do
    Let initialSize be the number of component ID's in Temp.
    Do a SQL query that joins Temp to the Relationship table such that the component ID in Temp matches either the first component ID or second component ID columns in Relationship. Add the other component ID from the Relationship table to Temp if that component ID is not already in Temp. All of this can be accomplished with one SQL query.
    If the number of rows in Temp is equal to initialSize then break out of the loop.
end In embodiments of this algorithm, the temporary table Temp now holds the ID's of all components desired. The table Temp to may be cross-referenced to the Component table (described above) to get the components identified.

It is important to note that using this algorithm to search an applied data model may be especially efficient. Embodiments of the algorithm are independent of the component or relationship types used in a data model. Additionally, embodiments of the algorithm may allow the traversal of a number of arbitrary levels in a particular graph.

For example, "send data to" relationship 1860 may have an arbitrary number of levels depending on the structure and complexity of the environment being represented with an applied data model. Utilizing embodiments of the algorithm these levels may be traversed without regard to their depth.

Embodiments of this algorithm, used with an applied data model of the kind described above, also have the advantage that no understanding of the schema or data model is needed to generate results. For example, a trace may be run on business unit types 1810. This trace (applying an embodiment of the algorithm above) may result in all components of machine type 1820 and application type 1830 related to each business unit component type 1810, agnostic of the relationships in the applied data model.

Moreover, this algorithm will allow efficient searching of an applied data model irrespective of changes to the schema used to represent the applied data model.

Imagine that a new component type "application server" 1910 is inserted into the schema depicted in FIG. 18. The resulting graph would be the graph depicted in FIG. 19. However, this change to the schema would not alter the effectiveness of a search of this applied data model using an embodiment of the search algorithm. If a search is run on a component of type "business unit" 1810 component, the components of type "machine" 1820 on which a "business unit" component type 1810 executes will still be located.

Contrast these capabilities with a standard search. For example, using the graph depicted in FIG. 18, a standard search starting with "business unit" component type 1810 and searching for "machine" component type 1820 may be represented in SQL as:

SELECT
        Machine.*
    FROM
        BusinessUnit, UsesApplication, Application, RunsOn, Machine
    WHERE BusinessUnit.ID in (starting set of business unit id's)
and BusinessUnit.ID=UsesApplication.businessUnitID and UsesApplication.applicationID=Application.ID and Application.ID=RunsOn.applicationID and RunsOn.machineID=Machine.ID As can be seen by one of ordinary skill in the art, this SQL algorithm is not independent of the component types used in an applied data model. The SQL algorithm cannot trace out arbitrary numbers of levels. It is virtually impossible using standard SQL for this algorithm to trace out arbitrary depths along the arbitrarily deep relationship type "sends data to" 1860 path. Thus, the SQL algorithm will not be able to return all the components associated with this relationship type.

Figure 19:
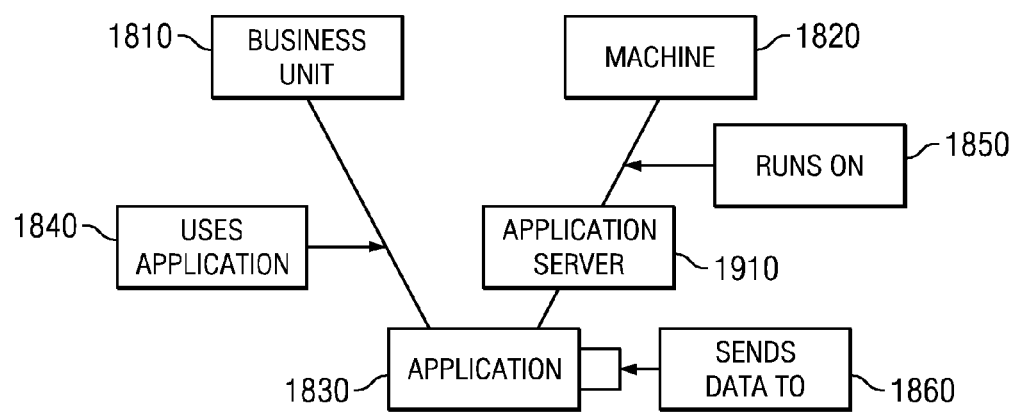
FIG. 19 illustrates a graph representation of an altered version of the example applied data model of FIG. 18.

Additionally, because the schema is hard-coded in the algorithm, an end user must understand the schema. Essentially the end user has to tell the algorithm the specific path through the entity/relationship diagram to trace. Searches utilizing this SQL algorithm will break if the schema is changed. If we added an "application server" type 1910 as depicted in FIG. 19, the SQL algorithm will not function properly.

Returning to FIG. 17, a search (block 1730) of the type described above may return a set of results (block 1740). These results (block 1740) may however be returned in a temporary data structure or table which may be cross-referenced to the applied data model, or compared against a set of further criteria. These results (block 1740) may then be processed according to the query (block 1750). In embodiments, this may entail joining a temporary table to a table in the schema employed by model 1630. For example, a search may return a list of components, however, only components of type "machine" 1820 were requested by the original query. The returned results may then be cross-referenced against a component table to select rows in which the component type is equal to "machine" 1820.

Note that not all of the tables, fields, or steps described are necessary, that tables, fields or steps may not be required, and that further tables, fields or steps may be added in addition to those illustrated. Additionally, the order in which each of the activities is listed is not necessarily the order in which they are performed. After reading this specification, a person of ordinary skill in the art will be capable of determining which tables, fields and orderings best suit any particular objective.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of modeling an arbitrarily complex environment, comprising:

providing a system comprising a model computer for defining a data model having a plurality of types of data structures, wherein each type of data structure comprises one or more fields, a database computer for storing a table schema in a static database, wherein the static database comprises a table for each type of data structure in the data model, wherein the plurality of types of data structures comprises components, relationships, properties and types, and a database connectivity computer for instantiating components from the plurality of types of data structures to represent entities in the arbitrarily complex environment;

instantiating a component from the plurality of types of data structures for representing each entity in the arbitrarily complex environment, wherein each instantiated component comprises a property field and check logic for determining the validity of a value in the property field;

representing each instantiated component in a component table in the database;

assigning one or more values to the one or more fields in the database based on the attributes of the entity which the component is intended to represent;

instantiating relationships, wherein each instantiated relationship comprises a property field and check logic for determining the validity of the relationship;

representing each instantiated relationship in a relationship table in the database;

linking each relationship to at least two components; and assigning one or more values based on the association which the relationship is intended to represent;

wherein altering the data model further comprises the steps of:

accessing, by a manager computer, the model computer, to add or alter a data structure, wherein the database computer is further configured to associate an added or altered field with one or more tables, and wherein the database connectivity computer is further configured to associate a third value with the added property field or the altered property field; and storing, by the model computer, the added or altered property field associated with the one or more data structures to the database, wherein the instantiation of components, relationships, properties and types associated with the added or altered fields does not change the defined data structures or the schema.

2. The method of claim 1, wherein each component is instantiated based on a generic component type and has a set of core attributes comprising an id, a name, a description, a type, and a set of properties and the schema comprises:

a propertyDefinition table, a componentType table, a component table, a PropertyCategory table, a propertyDefinition table, a propertyValue table, a relationshipType table and a relationship table, wherein the ComponentType table comprises a set of columns related to fields of a component type, wherein each component is linked to its type of component through a property field, whereby all instantiated components of a given type contain the same set of properties and check logic, wherein the RelationshipType table comprises a set of columns related to fields of a relationship type, wherein each relationship is linked to its type of relationship through a property field, whereby all instantiated relationships of a given type contain the same set of properties and check logic, wherein the PropertyCategory table comprises a set of columns related to the definition of a property, wherein each property is linked to its type of relationship through a property field, whereby all instantiated relationships of a given type contain the same set of properties and check logic, wherein the PropertyDefinition table comprises a set of definitions of particular properties, wherein one or more properties contains a link to a field in and a propertyValue table, wherein each property value comprises a link to a property definition in the propertyDefinition table and one of a link to a field in the ComponentType table or the RelationshipType table.

3. The method of claim 2, wherein each component type is in a hierarchy of component types, wherein a component subtype is a subgroup of a component type, wherein an instantiation of a component from a component subtype inherits all the property fields and check fields of the subtype and all the property fields and check fields of the parent component type.

4. The method of claim 2, wherein a property field comprises a data type of one of a string, a numeric, a Boolean, a link, a date/time and a custom type, wherein each property field in a component is associated with a property of the entity being represented.

5. The method of claim 2, wherein each property field comprises a data structure having a name, a description and a value.

6. The method of claim 2, wherein each component is represented in the component table, wherein each component stored in the component table is linked to a type of component, wherein altering the model to include a new property field comprises the steps of:

adding a row to a table in the data schema, wherein the row comprises one or more fields containing the definition of the property, wherein the property definition is linked to a componentID field in the componentType table, whereby the added property field is associated with all components having the same component type.

7. The method of claim 6, wherein each component type is represented in the component type table, wherein each component type stored in the component type table is linked to a property in the properly table.

8. A system for modeling an arbitrarily complex environment, comprising:

a computer having a memory for storing a set of computer-executable instructions and a processor for executing the computer-executable instructions operable to:

define a schema having a set of data structures, wherein each of the data structures comprises one or more fields;

instantiate components to represent physical and logical entities in the arbitrarily complex environment, wherein each instantiated component comprises a property field and check logic for determining the validity of a value in the property field;

instantiate relationships to represent associations between two or more components in the arbitrarily complex environment, wherein each instantiated relationship comprises a property field and check logic for determining the validity of the relationship;

store the schema in a database; and assign one or more values to the fields in the database;

wherein, when the data model is added to or altered, the system is further operable to:

store the added or altered data structure to the schema, wherein the addition or alteration of components, relationships, properties and types do not change the defined data structures or the data model.

9. The system of claim 8, wherein each component is instantiated based on a generic component type and has a set of core attributes comprising an id, a name, a description, a type, and a set of properties and the schema comprises:

a propertyDefinition table, a componentType table, a component table, a PropertyCategory table, a propertyDefinition table, a propertyValue table, a relationshipType table and a relationship table, wherein the ComponentType table comprises a set of columns related to fields of a component type, wherein each component is linked to its type of component through a property field, whereby all instantiated components of a given type contain the same set of properties and check logic, wherein the RelationshipType table comprises a set of columns related to fields of a relationship type, wherein each relationship is linked to its type of relationship through a property field, whereby all instantiated relationships of a given type contain the same set of properties and check logic, wherein the PropertyCategory table comprises a set of columns related to the definition of a property, wherein each property is linked to its type of relationship through a property field, whereby all instantiated relationships of a given type contain the same set of properties and check logic, wherein the PropertyDefinition table comprises a set of definitions of particular properties, wherein one or more properties contains a link to a field in and a propertyValue table, wherein each property value comprises a link to a property definition in the propertyDefinition table and one of a link to a field in the ComponentType table or the RelationshipType table.

10. The system of claim 9, wherein each component type is in a hierarchy of component types, wherein a component subtype is a subgroup of a component type, wherein an instantiation of a component from a component subtype inherits all the property fields and check fields of the subtype and all the property fields and check fields of the parent component type.

11. The system of claim 10, wherein a property field comprises a data type of one of a string, a numeric, a Boolean, a link, a date/time and a custom type, wherein each property field in a component is associated with a property of the entity being represented.

12. The system of claim 10, wherein a property field comprises a data structure having a name, a description and a value.

13. The system of claim 9, wherein each relationship type is a parent type or a subtype.

14. A software product comprising a set of instructions stored on a computer-readable medium in a computer, wherein the computer has a computer memory and a processor for executing the set of instructions, wherein the software product comprises:

an instruction to define a schema having a set of data structures, wherein each of the data structures comprises one or more fields; and an instruction to instantiate components to represent physical and logical entities in the arbitrarily complex environment, wherein each instantiated component comprises a property field and check logic for determining the validity of a value in the property field;

an instruction to instantiate relationships to represent associations between two or more components in the arbitrarily complex environment, wherein each instantiated relationship comprises a property field and check logic for determining the validity of the relationship;

an instruction to store the schema in a database; and an instruction to assign values to the fields in the database;

wherein, when the data model is added to or altered, the software product further comprises an instruction to store the added or altered data structure to the schema, wherein the addition or alteration of components, relationships, properties and types do not change the defined data structures or the data model.

15. The software product of claim 14, wherein each component is instantiated based on a generic component type and has a set of core attributes comprising an id, a name, a description, a type, and a set of properties and the schema comprises:

a propertyDefinition table, a componentType table, a component table, a PropertyCategory table, a propertyDefinition table, a propertyValue table, a relationshipType table and a relationship table, wherein the ComponentType table comprises a set of columns related to fields of a component type, wherein each component is linked to its type of component through a property field, whereby all instantiated components of a given type contain the same set of properties and check logic, wherein the RelationshipType table comprises a set of columns related to fields of a relationship type, wherein each relationship is linked to its type of relationship through a property field, whereby all instantiated relationships of a given type contain the same set of properties and check logic, wherein the PropertyCategory table comprises a set of columns related to the definition of a property, wherein each property is linked to its type of relationship through a property field, whereby all instantiated relationships of a given type contain the same set of properties and check logic, wherein the PropertyDefinition table comprises a set of definitions of particular properties, wherein one or more properties contains a link to a field in and a propertyValue table, wherein each property value comprises a link to a property definition in the propertyDefinition table and one of a link to a field in the ComponentType table or the RelationshipType table.

16. The software product of claim 15, wherein each component type is in a hierarchy of component types, wherein a component subtype is a subgroup of a component type, wherein an instantiation of a component from a component subtype inherits all the property fields and check fields of the subtype and all the property fields and check fields of the parent component type.

17. The software product of claim 16, wherein a property field comprises a data type of one of a string, a numeric, a Boolean, a link, a date/time and a custom type, wherein each property field in a component is associated with a property of the entity being represented.

18. The software product of claim 16, wherein a property field comprises a data structure having a name, a description and a value.

19. The software product of claim 18, wherein each relationship type is a parent type or a subtype.

* * * * *